Patented Aug. 18, 1953

2,649,460

UNITED STATES PATENT OFFICE 2,649,460

DERIVATIVES OF 2,7-DIAMINOTHIOXANTHONE DIOXIDE

Edward Delbert Amstutz, Bethlehem, Pa., assignor to The Wm. S. Merrell Company, Cincinnati, Ohio, a corporation of Delaware No Drawing. Original application July 23, 1946, Serial No. 685,787. Divided and this application December 6, 1950, Serial No. 199,586

4 Claims. (Cl. 260—328)

The present invention relates to new chemical compounds and more particularly to aldehyde sulfoxylate and aldehyde bisulfite derivatives of 2,7-diaminothioxanthone dioxide and 2,7-diaminothioxanthenol dioxide. These compounds characterized by aldehyde sulfoxylate and bisulfite substituted aminophenyl groups linked together by a carbonyl or hydroxymethylene group and the sulfone ($SO_2$) group are of value for combating bacterial infections.

The compounds may be represented by the following formula:

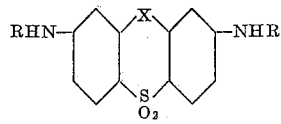

where X is selected from the group consisting of carbonyl and hydroxymethylene, and R is selected from the group consisting of aldehyde sulfoxylate and bisulfite radicals.

EXAMPLE I

2,7-diaminothioxanthone dioxide

This compound is conveniently prepared in a four-step process as follows:

(a) *5-nitro-2-(p-nitrothiophenoxy) benzaldehyde.*—A hot solution of 5-nitro-2-chlorobenzaldehyde (0.14 mole) and 350 ml. of alcohol is prepared and diluted with 140 ml. of warm water. p-Nitro-thiophenoxide (0.15 mole) is then added with stirring. The mixture is heated to reflux for about 1 hour, and after cooling the precipitate is filtered and washed successively with cold alcohol and water. The yield of 5-nitro-2-(p-nitrothiophenoxy) benzaldehyde is high.

(b) *Cyclization of 5-nitro-2-(p-nitrothiophenoxy) benzaldehyde.*—The dry product obtained in step (a) (0.12 mole) is added with stirring to concentrated sulfuric acid (370 ml.) over a period of about 1 hour. The mixture is slowly heated to 60° C. and is maintained at this temperature for 15 mins., whereupon it is cooled and poured onto chipped ice (about 600 grams). The precipitate which separates is filtered, washed with water, and dried. The product is a mixture of 2,7-dinitrothioxanthone and 2,7-dinitrothioxanthone, which is not separated.

(c) *2,7-dinitrothioxanthone dioxide.*—The dry product from step (b) is heated to reflux with a mixture of glacial acetic acid (730 ml.) and 30% hydrogen peroxide (103 grams) for 4 hours. The reaction mixture is cooled and the precipitate is filtered and washed successively with water, sodium bicarbonate solution, and again with water. The yield of dry 2,7-dinitrothioxanthone dioxide is high.

(d) *2,7-diaminothioxanthone dioxide.*—A suspension of 2,7-dinitrothioxanthone dioxide (0.1 mole) in glacial acetic acid (135 ml.) is prepared and is heated to 80° on a steam bath. A solution of stannous chloride dihydrate (0.75 mole) in glacial acetic acid (450 ml.) saturated with gaseous hydrogen chloride is added gradually with stirring. After the addition of all the stannous chloride, heating is continued for about 2 hours at 80° C. The mixture is now cooled to 10° C. and the precipitate is removed by filtration and washed thoroughly with water. The washed filter cake is suspended in water made alkaline by the addition of sodium hydroxide solution, and the orange colored diamino compound is then filtered with suction, washed with water and dried. The crude product is heated to reflux with about 500 ml. of acetone. The hot mixture is filtered and the clear yellow filtrate concentrated to a volume of about 150 ml. Upon cooling the pure 2,7-diamino-thioxanthone dioxide, M. P. 293.5–298° C., separates as a yellow crystalline powder in good yield.

EXAMPLE II

2,7-diaminothioxanthenol dioxide 2,7-dinitrothioxanthone dioxide (0.1 mole) in 80% acetic acid (400 ml.) is heated gradually to reflux with zinc dust (1.0 equivalent) which has previously been washed with hot dilute hydrochloric acid. The initial phase of the reduction is spontaneously exothermic and external heat is not required. The total reflux period is about 1 hour with the liquid becoming a pale yellow in color. The boiling mixture is then filtered to remove the excess zinc and the hot filtrate is diluted with 1500 ml. of hot water. On cooling, a colorless precipitate separates which is suction filtered, and washed with sodium bicarbonate solution followed by water. The yield of dry product, M. P. 204° C., is high. After recrystallization (Darco) from about 400 ml. of alcohol, the product melts at 212° C. with decomposition.

The derivatives to which the present application is directed are prepared by reacting the products of Examples I and II with aldehyde sulfoxylate and aldehyde bisulfite products. The following examples are illustrative:

EXAMPLE III

Sodium 2,7-diaminothioxanthone dioxide bis-formaldehydesulfoxylate dihydrate 2,7-diaminothioxanthone dioxide (0.044 mole) is heated for 6 hours in a mixture composed of 23 ml. of 99.5% methanol, 455 ml. of absolute alcohol and sodium formaldehyde sulfoxylate dihydrate (0.088 mole) which has been recrystallized from water. After cooling, the precipitate is removed by filtration and washed with acetone until a sample of the product forms a clear, aqueous solution. The material is dried in vacuo over phosphoric anhydride. The yield of sodium 2,7-diaminothioxanthone dioxide bisformaldehyde sulfoxylate dihydrate, M. P. 279° C. with decomposition, is high.

EXAMPLE IV

*Sodium 2,7-diaminothioxanthone dioxide-N,N-bis-(3-phenyl-2-propene-1-sulfonate)*

This is the sodium cinnamaldehyde bisulfite derivative of 2,7-diaminothioxanthone dioxide. A mixture of 2,7-diaminothioxanthone dioxide (0.0036 mole) and sodium cinnamaldehyde bisulfite (0.0068 mole) is heated to reflux in 60 ml. of absolute alcohol for about 7 hours. After cooling, the product is removed by filtration and washed three times with acetone to yield a pale yellow powder which is completely soluble in water. The melting point is 256.5–265.5° C. with decomposition.

EXAMPLE V

*Sodium 2,7-diaminothioxanthenol dioxide bisformaldehydesulfoxylate*

2,7-diaminothioxanthenol dioxide (0.054 mole) and recrystallized sodium formaldehydesulfoxylate (0.106 mole) are refluxed in a mixture of 99.5% methanol (30 ml.) and absolute alcohol (600 ml.) on a steam bath for 4½ hours. After cooling, the colorless precipitate is removed by filtration, washed with ether and dried in vacuo over phosphoric anhydride. The yield of sodium 2,7-diaminothioxanthene dioxide bis-formaldehydesulfoxylate is high. This product melts at 269° C. with decomposition.

The present application is a division of my prior application Serial No. 685,787 filed July 23, 1946.

I claim:

1. A compound represented by the following formula:

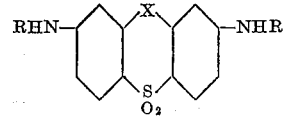

where X is selected from the group consisting of carbonyl and hydroxymethylene, and R is selected from the group consisting of aldehyde sulfoxylate and aldehyde bisulfite radicals, wherein the aldehyde portion of the radicals is selected from the group consisting of formaldehyde and cinnamaldehyde and wherein R is attached to the respective amino groups through its reactive aldehyde carbon atom.

2. Sodium 2,7-diaminothioxanthone dioxide bisformaldehydesulfoxylate.

3. Sodium 2,7-diaminothioxanthenol dioxide bisformaldehydesulfoxylate.

4. Sodium 2,7-diaminothioxanthone dioxide-N,N'-bis-(3-phenyl-2-propene-1-sulfonate).

EDWARD DELBERT AMSTUTZ.

References Cited in the file of this patent

FOREIGN PATENTS

| Number | Country | Date |
|--------|---------|------|
| 618,121 | Germany | Sept. 2, 1935 |